Jan. 17, 1967  J. DASTOLI ET AL  3,298,633
SEPARABLE AIRCRAFT

Original Filed Aug. 3, 1964                3 Sheets-Sheet 1

INVENTORS
LEON J. HALEPAS
JOSEPH DASTOLI
BY  WILLIAM DEHNEL

*LeBlanc & Shur*
ATTORNEYS

Jan. 17, 1967  J. DASTOLI ETAL  3,298,633
SEPARABLE AIRCRAFT
Original Filed Aug. 3, 1964  3 Sheets-Sheet 2
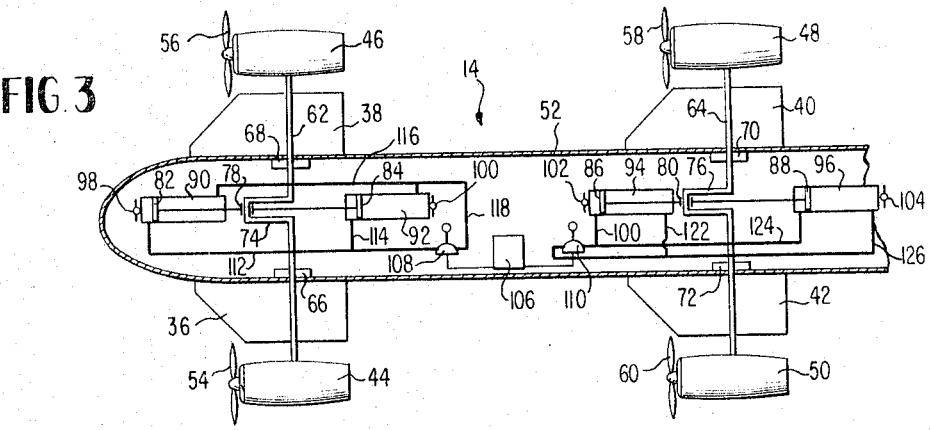
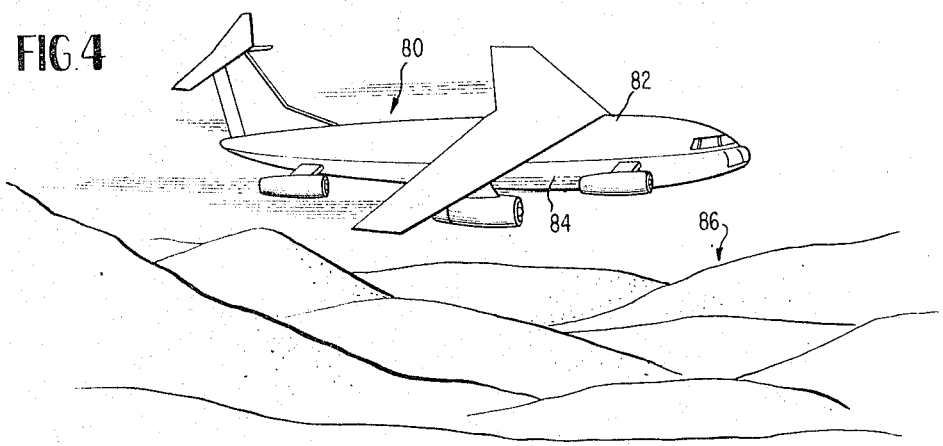
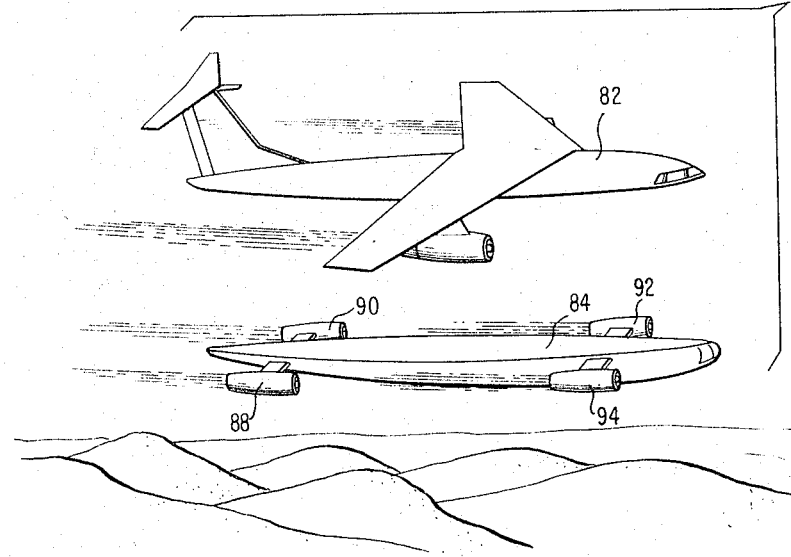
INVENTORS
LEON J. HALEPAS
JOSEPH DASTOLI
WILLIAM DEHNEL
ATTORNEYS

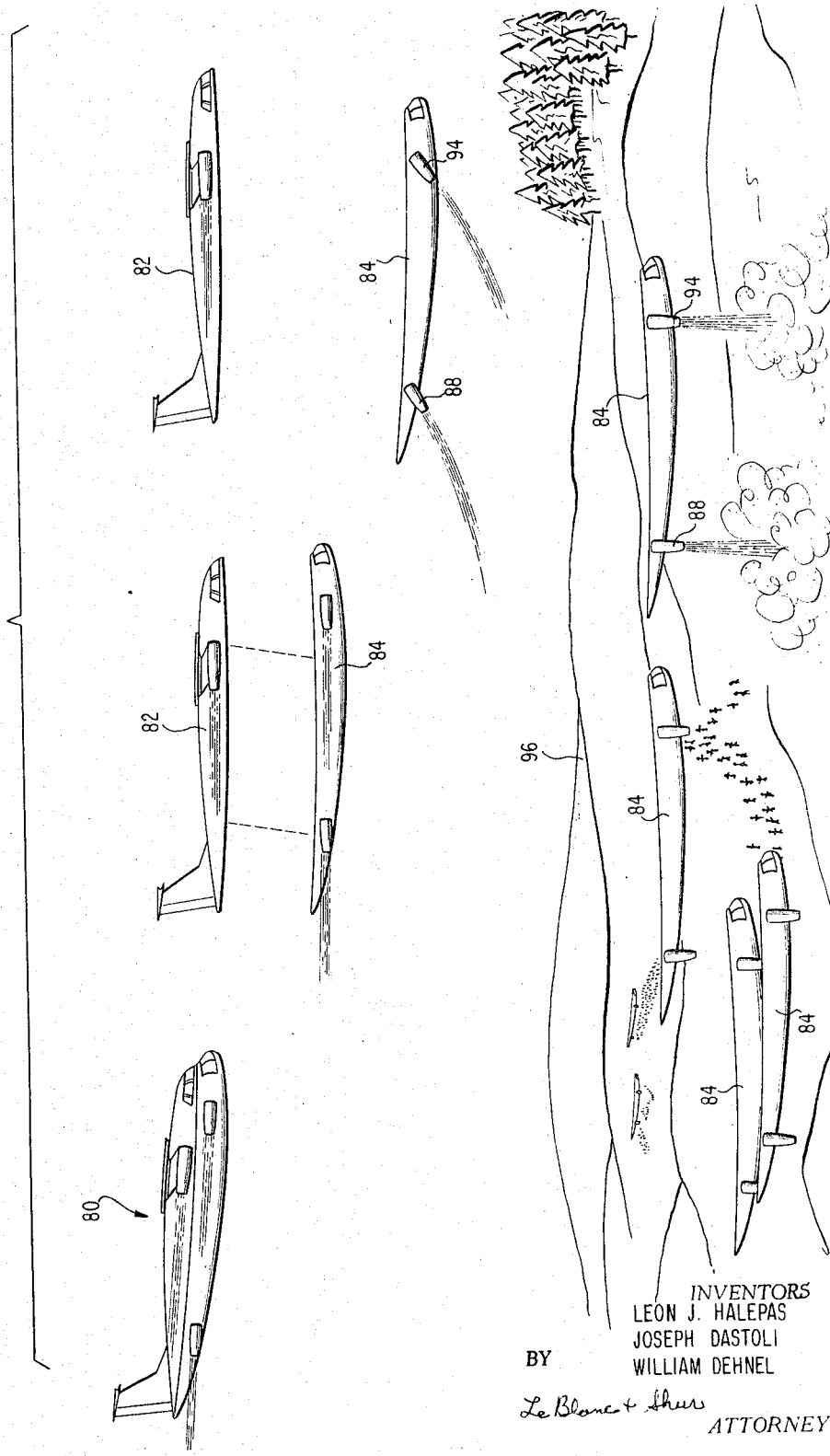

3,298,633
SEPARABLE AIRCRAFT
Joseph Dastoli, 65 Yale Cleres Road, William Dehnel, 14 Vale Ave., and Leon J. Halepas, 412 W. Main St., all of Meriden, Conn. 06450
Continuation of application Ser. No. 386,910, Aug. 3, 1964. This application Sept. 10, 1965, Ser. No. 492,972
4 Claims. (Cl. 244—2)

This application is a continuation of copending application Serial No. 386,910, filed August 3, 1964, now abandoned.

This invention relates to a separable aircraft and more particularly to a divorcee-type aircraft having tiltable turbojets combining the optimum features of a long-range high-speed carrier for use in the delivery of a short range troop transport or passenger craft to its destination or target. Although described primarily in conjunction with the delivery of passengers or of cargo to a point of destination, the separable aircraft of the present invention may be used as a safety craft in the manner of the safety aircraft described in our copending application Serial No. 308,936, filed September 16, 1963, and now Patent No. 3,227,399, for which the present application is a continuation-in-part.

As is well known, the United States Air Force is proposing the development of a wide variety of advanced aircraft including large 10,000 mile range transports and radically different heavy bombers to deal with any war potential the nation may face in the early 1970's. Among the aircraft being considered for use in the coming ten to fifteen years, is a gigantic transport for moving Army troops and equipment having such vast range and certain other characteristics that the United States can be independent of foreign bases to whatever degree it desires. The proposed plane is estimated to have a range of from 10 to possibly 12 thousand miles. It is estimated to be able to carry 50 tons and is hoped would be capable of dropping equipment gently, precisely, and where needed, preferably without landing. It is now estimated that some time after 1975 ranges of from 16,000 to 18,000 miles will be attainable and approximately $17 million has been earmarked for studies of transports capable of accomplishing troop delivery according to the foregoing proposals and requirements.

Furthermore, it is well known that despite continuous and comprehensive safety measures, aircraft accidents each year cost a disastrous loss of lives and property. As one approach to an alleviation of this problem, numerous attempts have been made to provide an auxiliary emergency support system for the aircraft and for devising a workable escape compartment for the crew and passengers. However, while prior systems have provided some relief in the case of ejection of individual pilots in military aircraft, no satisfactory solution has ever been achieved in relation to passenger aircraft or heavy troop and transport carriers.

One of the earliest attempts at producing a detachable safety compartment for returning the aircraft passengers to the earth utilized a parachute member which supported the compartment as it descended. The inability of the parachute system to assure a relatively gentle or soft landing rendered these systems impractical for large aircraft and is primarily due to the fact that there is no known way to control either the rate or direction of descent to an appreciable extent. In an effort to eliminate at least a portion of the difficulty associated with the parachute method of lowering compartments of disabled aircraft to the ground, a second method of permitting a somewhat controlled descent of an object was proposed and tested. This method utilized a free wheeling propeller or rotor blade attached to the aircraft which, as is well known in helicopter aircraft, checked the descent to a limited extent and added the desirable feature of a controlled descent in that at least the direction of the descent could be controlled within certain restricted limits by varying the pitch and tilt of the propeller.

Yet a third descent system has been proposed in which the parachute and propeller systems are combined with the thought that this combination would give a slower descent for the aircraft. This combined system, however, proved to be only slightly more desirable than either of the prior proposed systems operating alone. Thus, in an attempt to increase the controlled descent of the aircraft as it neared the ground, a drive system was connected to the propellers.

Finally, a further type of descent system, such as described in U.S. Patent 2,497,590 proposed the use of an auxiliary power plant and propeller system which would be sufficiently large to support the complete weight of the entire aircraft should the main power plants fail. However, as a practical matter, it has been found that this cannot be done by larger aircraft since a system of the necessary weight capability is presently impossible to construct. Even on small aircraft, it is economically unwise to place a motor-propeller system of this power capacity aboard, since it occupies too much space and is prohibitive from the weight standpoint. In addition to this, no practical manner was found to place the propeller system in operation above the aircraft as proposed due to the extreme speed and other conditions existing in and about aircraft in flight.

According to the present invention, it has been found that a practical and satisfactory solution to the above-enumerated problems can be obtained by utilizing a separable compartment, either as a safety compartment or as a separate passenger or cargo delivery unit, having its own independent power plant in the form of a plurality of turboprop motors of the tiltable variety which may be tilted from a horizontal to a vertical position. This delivery or low speed unit is attached to a much larger high speed unit or mother aircraft by a conventional releasable clamp arrangement that assures a fast and positive release of the compartment only when the aircraft is moving at a safe speed.

Although tiltable power plants have been proposed in the past for aircraft, particularly in conjunction with the vertical take off and landing aircraft commonly referred to as VTOL, it is believed that the present invention constitutes the first provision of tiltable power plants on the separable compartment of an aircraft. Important features of the invention include the fact that while the separable unit is completely independent of the mother aircraft and may be separately flown once divorced therefrom, the auxiliary power units which it carries may be used during attached flight to complement or augment the power of the larger unit or mother aircraft.

By incorporating tiltable power units, the problems associated with high-speed drag and windage problems during normal flight of the high-speed mother aircraft are minimized or completely eliminated. In addition, any tendency for the auxiliary power unit to be torn off or damaged either prior to or subsequent to separation of the two units is minimized by the tiltable nature of the proposed units on the separable section. That is, the unit of the present invention permits separation at the relatively high speed of the mother aircraft since the units may be separated with the auxiliary propulsion motors in the normal or horizontal thrust position where there is a minimum drag. Once the units have been separated the auxiliary compartment under its own flight control may be slowed down to permissible speeds, i.e., below 200 miles per hour, before the auxiliary propulsion motors are tilted so that the strain on the supports for these motors is minimized. Once the auxiliary power plants are tilted to the vertical position, a soft, controlled vertical landing can be readily effected.

Accordingly, it is one object of the present invention to provide a novel separable aircraft.

Another object of the present invention is to provide an aircraft having a separately flyable safety compartment.

Another object of the present invention is to provide a separable aircraft combining the high-speed and long-range features of the mother aircraft with the vertical take off and landing features of a separately flyable compartment.

Another object of the present invention is to provide a separable aircraft wherein one of the separately flyable elements of the aircraft incorporates power plants tiltable from the horizontal to the vertical position.

Another object of the present invention is to provide a separable compartment for an aircraft having a plurality of turboprop power plants tiltable from the vertical to the horizontal.

Another object of the present invention is to provide a separately flyable compartment for an aircraft having tiltable power plants supported outboard of the compartment body or fuselage.

Another object of the present invention is to provide a separately flyable compartment for an aircraft with conventional controls, that is, ailerons, stabilizer, elevator, etc., and conventional controls that become operative when the compartment is hovering.

These and further objects and advantages of the invention will be more apparent upon reference to the following specification, claims and appended drawings, wherein:

FIGURE 3 is a diagrammatic plan view illustrating the tilting mechanism for the auxiliary power plants of the aircraft of FIGURES 1 and 2;

FIGURE 4 is a perspective view of a second embodiment of the present invention;

FIGURE 5 shows the two separately flyable units of the aircraft of FIGURE 4; and, FIGURE 6 illustrates a sequence of operation of the separable aircraft of FIGURES 4 and 5.

Figure 1:
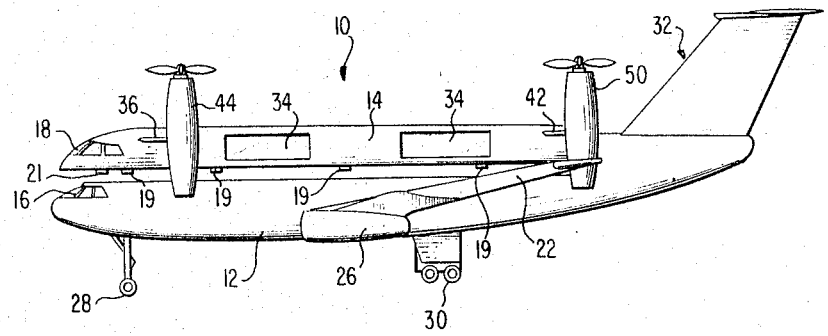
FIGURE 1 is an elevational view of a first embodiment of a separable aircraft constructed in accordance with the present invention showing the auxiliary compartment separated from a mother aircraft with the auxiliary power plants tilted to a vertical position.
Figure 2:
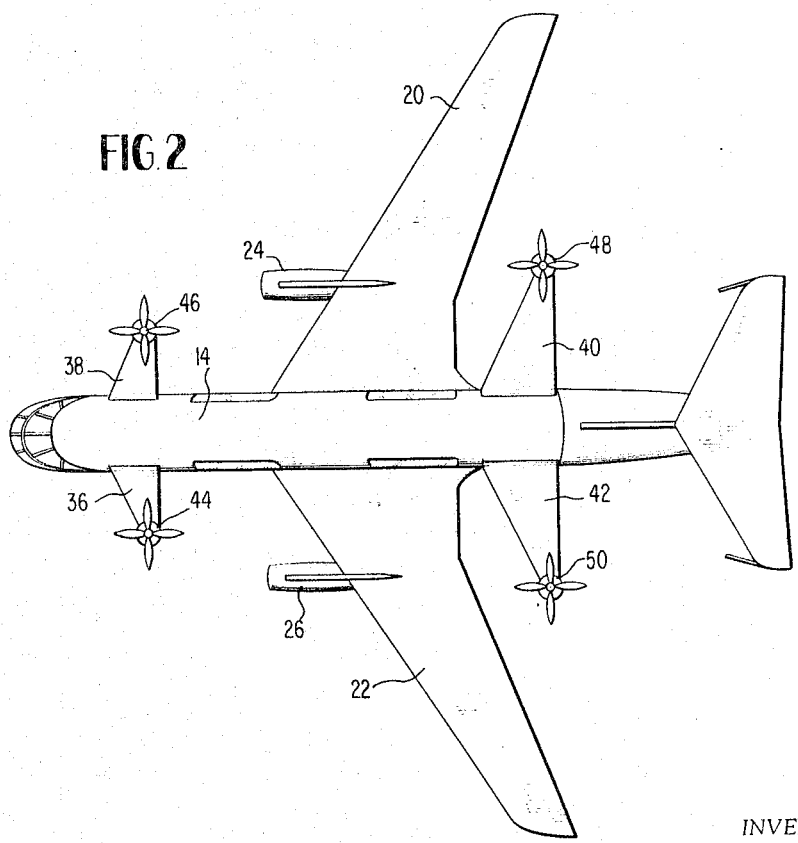
FIGURE 2 is a plan view of the aircraft of FIGURE 1.

Referring to the drawings, and particularly to FIGURES 1 and 2, there is shown a first embodiment of the present invention comprising a separable aircraft generally indicated at 10 including a long-range high speed larger unit or mother aircraft 12 and the separable compartment 14. Each unit is separately flyable with the mother aircraft having the usual cockpit 16 and the compartment 14 having a similar cockpit 18 with a dual set of controls. The units are suitably joined by releasable clamps 19 and separable connectors 21 for coordinating the power plants and controls during normal attached flight if desired. These features per se form no part of the present invention and reference may be had to the above-mentioned co-pending application Ser. No. 308,936, filed September 16, 1963, now Patent No. 3,227,399, for a detailed discussion of the releasable connections between the two units.

The mother aircraft 12 is provided with wings 20 and 22 carrying two or more conventional jet power plants 24 and 26 sufficient to provide the unit with long-range high speed capabilities. Also provided is the nose wheel 28 and landing gear 30 of conventional type. The mother aircraft is also provided with the conventional tail section 32.

Separable compartment 14 is provided with a plurality of windows 34 and carries two pairs of short or stub wings 36, 38, 40 and 42. Mounted on the ends of each of the stub wings is a tiltable power plant 44, 46, 48 and 50 in the form of a tiltable turboprop or gas turbine motor. The two units may be separated in the manner illustrated in FIGURE 1 at times when the aircraft is traveling at relatively low speeds, such as those below 200 miles per hour, so that the turboprop motors may be tilted from the horizontal to the vertical position illustrated. At this time, the unit will slow down still further depending upon the angle of the turboprop engines until the forward speed diminishes almost to zero and by proper control of the engine angle and speed, substantial maneuverability and the assurance of a soft landing is available to the pilot in the cockpit 18 of the separable compartment.

Referring to FIGURE 3, the short wings 36, 38, 40 and 42 are attached to the fuselage 52 of the compartment 14 at spaced points adjacent its upper end and each of the engines which are of the gas turbine or turboprop type carry the conventional four bladed propellers 54, 56, 58 and 60. The engines are mounted on a pair of transversely extending single throw crankshafts 62 and 64 which crankshafts are rigidly connected at their outer ends to approximately the midpoints of the respective engines such that the weight of each engine is reasonably balanced between the fore and aft sides of the crankshafts.

Each of the single throw crankshafts 62 and 64 passes through suitable bearings 66, 68, 70 and 72 mounted on the fuselage 52. The crankshafts may, if desired, pass through the short wings 36, 38, 40 and 42 to receive additional support therefrom and if necessary additional bearings may be provided. The shafts 62 and 64 carry at their midpoints respective cranks 74 and 76 which are, in turn, pivotally connected as indicated at 78 and 80 to the ends of the rods of double acting pistons 82, 84, 86 and 88. These pistons are slidable in respective hydraulic cylinders 90, 92, 94 and 96, which are in turn anchored to the fuselage 52 by the pivot connections 98, 100, 102 and 104.

Hydraulic fluid is supplied to the pistons from a hydraulic pump 106 carried by the fuselage 52 which supplies fluid to the cylinders through a pair of double acting hydraulic cylinder valves 108 and 110. The valves 108 and 110 are suitably controlled from the cockpit 18 in a conventional manner.

Pump 106 supplies hydraulic fluid through valve 108 by way of hydraulic lines 112 and 114 to the left side of the rightmost side of these pistons. Hydraulic fluid is similarly supplied from the pump 106 by way of hydraulic lines 120, 122, 124 and 126 to the respective sides of the pistons 86 and 88. In the position illustrated, the engines 44, 46, 48 and 50 are in the horizontal position which they assume during normal flight when the two sections of the aircraft are joined, which positions they continue to assume when the aircraft units are separated at high speeds as previously mentioned. Through suitable actuation of a control stick or the like in cockpit 18, valves 108 and 110 are actuated to cause hydraulic fluid to be supplied to the leftmost side of the pistons illustrated in FIGURE 3 and to be correspondingly withdrawn through the valves from the right sides of the pistons. This causes the pistons to move to the right of the drawing in FIGURE 3, thus causing the cranks 74 and 76 to be actuated or thrown through the pivot connections 78 and 80 to the right, causing the engines to pivot from the horizontal position towards the vertical. When the pistons move all the way to the right in the respective cylinders, the crankshafts are rotated 90° and the engines correspondingly so that they then assume a vertical position. If desired, the valves 108 and 110 may be actuated to cause the pistons to assume any intermediate position so that the engines will impart a thrust to the unit in any direction between the vertical and horizontal.

FIGURE 4 shows a modified embodiment of the separable aircraft of the present invention generally indicated at 80 and is particularly suited as a troop carrier or passenger carrier for military or civilian use. The separable aircraft 80 of FIGURE 4 is similar in all respects to the separable aircraft of FIGURES 1 through 3, with the exception that the mother aircraft 82 comprises the upper portion of the combination and the separable compartment 84 is carried by and drops away from the underside of the mother unit. FIGURE 4 illustrates the combined aircraft flying preferably at high altitudes and high speeds over rough terrain as indicated at 86 as might be encountered during long range missions or trips. In FIGURE 5 the two sections 82 and 84 have been separated or divorced and it can be seen that the tiltable turbojet engines 88, 90, 92 and 94 are in the horizontal position indicating a high speed separation, that is, the two units have been separated at a speed in excess of approximately 200 miles per hour.

The complete sequence is illustrated in FIGURE 6 where the combined aircraft 80 flying at relatively high speed approaches its point of destination and the two sections 82 and 84 separate with the mother aircraft or upper section continuing on its journey. If a military mission, the mother aircraft 82 would conventionally return to its base or to a further destination to pick up an additional separable section 84. Likewise in the case of commercial airlines, the mother aircraft section 82 might continue on to an outlying field or base terminal while the separable section 84 descended to a midcity heliport or the like. FIGURE 6 further illustrates the separable section 84 proceeding downwardly with the turbojet engines 88 and 94 first in an intermediate position between the horizontal and vertical as the section slows down and finally in a completely vertical position as the separable section 84 settles towards the earth, as indicated at 96. Other separable sections 84 are illustrated as already on the ground to discharge and pick up passengers or in the case of military operation to act as a temporary base for troops. In the latter case, it is preferred that the separable section 84 be provided with suitable radio equipment so as to communicate with other units and to receive instructions from headquarters for the proper deployment of troops and for the proper discharge of any cargo it may have carried.

It is apparent from the above the present invention provides a novel separable aircraft combining the desirable features of high speed and long range with the additional desirable features of a controlled vertical descent to assure a soft landing at the exact point of destination. Important features of the present invention include a separable low speed compartment having tiltable propulsion units mounted thereon capable of tilting from a horizontal to a vertical position so that the unit may be separated at high speeds without undue damage to the superstructure of the aircraft section or to the engines or their mounts. In each embodiment, the mother aircraft and the separable compartment have complementary configurations which when joined form a single unitary fuselage for the aircraft as best seen in FIGURES 1, 2 and 4. In addition, the incorporation of turbojet motors on short wings for the auxiliary section assures optimum propulsion to weight ratios and optimum wind resistant design features for the auxiliary propulsion power plants.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A separable aircraft comprising a first long range high speed separately flyable unit having a plurality of long range power plants mounted thereon, and a second short range separately flyable unit releasably joined to said first unit, said units having complementary fuselage configurations extending substantially from the nose along a major portion of the length of said aircraft which when joined form a single unitary fuselage for said aircraft, said second unit including means tiltable through an angle of 90° for developing thrust both parallel and perpendicular to the longitudinal center line of said second unit.

2. A separable aircraft comprising a separately flyable long range unit including a cockpit and a pair of wings, a plurality of long range power plants mounted on said wings, and a short range unit including a cockpit releasably coupled to said long range unit, said units having complementary fuselage configurations extending substantially from the nose along a major portion of the length of said aircraft which when joined form a single unitary fuselage for said aircraft, said short range unit including a pair of short wings, a gas turbine engine mounted at the end of each of said short wings, and hydraulic means in said short range unit for tilting said engines from a horizontal to a vertical position.

3. An aircraft according to claim 2 wherein said short range unit is mounted atop said long range unit.

4. An aircraft according to claim 2 wherein said short range unit is mounted beneath said long range unit.

References Cited by the Examiner

UNITED STATES PATENTS

| 1,828,607 | 10/1931 | Koun | 244/56 X |
|---|---|---|---|
| 2,921,756 | 1/1960 | Borden et al. | 244/2 |
| 3,006,576 | 10/1961 | Elijah | 244—2 |
| 3,070,326 | 12/1962 | Griffith | 244—2 |
| 3,181,810 | 5/1965 | Olson | 244—7 |

FOREIGN PATENTS 1,199,580  12/1959  France.

MILTON BUCHLER, *Primary Examiner.*

T. MAJOR, *Assistant Examiner.*